(12) United States Patent
Park et al.

(10) Patent No.: US 10,222,551 B2
(45) Date of Patent: Mar. 5, 2019

(54) WAVEGUIDE HAVING BI-DIRECTIONAL OPTICAL TRANSMISSION STRUCTURE

(71) Applicant: Korea Advanced Institute of Science and Technology, Daejeon (KR)

(72) Inventors: Hyo-Hoon Park, Daejeon (KR); Jong-Hun Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/542,673

(22) PCT Filed: Jan. 12, 2016

(86) PCT No.: PCT/KR2016/000261
§ 371 (c)(1),
(2) Date: Jul. 11, 2017

(87) PCT Pub. No.: WO2016/114543
PCT Pub. Date: Jul. 21, 2016

(65) Prior Publication Data
US 2017/0322374 A1  Nov. 9, 2017

(30) Foreign Application Priority Data
Jan. 12, 2015  (KR) .................. 10-2015-0004083

(51) Int. Cl.
*G02B 6/26*  (2006.01)
*G02B 6/125*  (2006.01)
(Continued)

(52) U.S. Cl.
CPC ............... *G02B 6/125* (2013.01); *G02B 6/26* (2013.01); *G02B 6/35* (2013.01); *G02B 2006/12102* (2013.01); *G02B 2006/12104* (2013.01)

(58) Field of Classification Search
None
See application file for complete search history.

(56) References Cited

FOREIGN PATENT DOCUMENTS

JP  H10-325911 A  * 12/1998
JP  2006-301566 A  11/2006
(Continued)

OTHER PUBLICATIONS

International Search Report for PCT/KR2016/000261, dated Apr. 26, 2016.

*Primary Examiner* — Jerry Rahll
(74) *Attorney, Agent, or Firm* — Hauptman Ham, LLP

(57) ABSTRACT

A waveguide having a bi-directional optical transmission structure comprises: a main waveguide which is formed in a preset direction; a branch waveguide which is connected to at least one of both ends of the main waveguide; and a reflector which is placed at an intersection where the branch waveguide and the at least one of both ends of the main waveguide are connected, and which has a different refraction index from the refraction index of the main waveguide and the refraction index of the branch waveguide, wherein the reflector refracts or reflects in different forms the bidirectional light signals for transmission and reception, and thereby directs the light signal for transmission to the main waveguide, and separates the light signal for reception to the branch waveguide.

15 Claims, 6 Drawing Sheets

(51) Int. Cl.
  *G02B 6/35* (2006.01)
  *G02B 6/12* (2006.01)

(56) References Cited

FOREIGN PATENT DOCUMENTS

| | | |
|---|---|---|
| JP | 2007-147740 A | 6/2007 |
| KR | 10-1129223 A | 3/2012 |
| KR | 10-2014-0042007 A | 4/2014 |

* cited by examiner

WAVEGUIDE HAVING BI-DIRECTIONAL OPTICAL TRANSMISSION STRUCTURE

CROSS-REFERENCE TO RELATED APPLICATION

This application is a National Entry Phase Application of Patent Cooperation Treaty Application Serial No. PCT/KR2016/000261, filed on Jan. 12, 2016. Further, this application claims priority from Korean Patent Application KR 10-2015-0004083, filed on Jan. 12, 2015, the entire contents of which are hereby incorporated by reference into this Application.

TECHNICAL FIELD

Embodiments of the inventive concept relates to bidirectional optical transmission which uses a path change by refracting and reflecting an optical signal, and more particularly, to a waveguide structure in which a transmitting optical signal incident upon a reflector is directed to a main waveguide and a receiving optical signal incident upon the reflector is directed to a branch waveguide by using the reflector arranged at an intersection where the main waveguide crosses the branch waveguide is connected to at least one of opposite ends of the main waveguide through which an optical signal is bi-directionally transmitted.

BACKGROUND ART

According to the related art, two optical waveguides are used to bi-directionally transmit an optical signal, so that the two optical waveguides are classified into a transmitting optical waveguide and a receiving optical waveguide to transmit the bi-directional optical signals. However, according to the related art, since two optical waveguides are used over the whole optical signal transmission path, the whole optical signal transmission path may be huge.

In addition, differently from the scheme of bi-directional transmission of optical signals described above, as another example of the relate art, there is a scheme of transmitting and receiving optical signals through a single optical waveguide by using the difference in wavelength or polarization. However, since the scheme is required to provide a separated optical device having a function of separating an optical signal on a waveguide according to the wavelength or polarization, the scheme may be complexed in structure.

Thus, in the present disclosure, there is proposed a waveguide having a bi-directional optical transmission structure, which refracts or reflects transmitting and receiving optical signal incident upon a reflector in mutually different forms by using the reflector arranged at an intersection where a main waveguide crosses a branch waveguide connected to at least one of the opposite ends of the main waveguide, instead of the separated optical device.

DETAILED DESCRIPTION OF THE INVENTION

Technical Problem

Embodiments of the inventive concept provide a waveguide having a bi-directional optical transmission structure, which refracts or reflects transmitting and receiving optical signals incident upon a reflector in mutually different forms by using the reflector arranged at an intersection where a main waveguide crosses a branch waveguide connected to at least one of opposite ends of the main waveguide.

In detail, embodiments of the inventive concept provide a waveguide having a bi-directional optical transmission structure, which allows an incident transmitting optical signal to propagate to a main waveguide and an incident receiving optical signal to be directed to a branch waveguide by refracting the incident transmitting optical signal and reflecting the incident receiving optical signal.

In this case, embodiments of the inventive concept provide a waveguide having a bi-directional optical transmission structure, which allows an incident transmitting optical signal to propagate to a main waveguide and an incident receiving optical signal to be directed to a branch waveguide by using a passive reflection or transmission property of a reflector without any additional energy consumption.

In addition, embodiments of the inventive concept provide a waveguide having a bi-directional optical transmission structure, which separates incident transmitting and receiving optical signals from each other by using a reflector without using any additional optical devices having a function of separating an optical signal according to the wavelength or polarization even though the incident of transmitting and receiving optical signals have the same wavelength or polarization.

Technical Solution

According to an embodiment, a waveguide having a bi-directional optical transmission structure includes: a main waveguide formed in a preset direction; a branch waveguide connected to at least one of opposite ends of the main waveguide; and a reflector arranged at an intersection where the at least one of the opposite ends of the main waveguide is connected to the branch waveguide, the reflector having a refractive index different from refractive indexes of the main waveguide and the branch waveguide, wherein the reflector refracts a transmitting optical signal or reflects a receiving optical signal incident thereupon in mutually different forms, such that the transmitting optical signal propagates to the main waveguide and the receiving optical signal is directed to the branch waveguide.

At least one of boundaries included in the reflector may be formed at an angle such that an incident angle of at least one of the transmitting and receiving optical signal upon the reflector is less than a critical angle at which total internal reflection occurs, and the receiving optical signal incident upon the reflector may be reflected to be directed to the branch waveguide by utilizing the total internal reflection.

When the refractive index of the reflector is less than the refractive indexes of the main and branch waveguides, a reception boundary included in the reflector may be formed at an angle, such that an incident angle of at least one of the transmitting and receiving optical signal incident upon the reflector is less than the critical angle and the receiving optical signal incident upon the reflector is totally and internally reflected to be directed to the branch waveguide, and the reception boundary may externally refract the transmission optical signal, which is internally refracted by a transmission boundary included in the reflector and distinguished from the reception boundary to propagate to an inside of the reflector, such that the transmitting optical signal propagates to the main waveguide.

The transmission boundary may be formed at an angle such that the incident angle of the at least one of the transmitting and receiving optical signal upon the reflector is greater than the critical angle, and the transmission boundary may internally refract the transmitting optical signal incident upon the reflector such that the transmitting optical signal propagates to an inside of the reflector.

At least one of the refractive indexes of the main and branch waveguides and the reflector and the angles of the transmission and reception boundaries may be adaptively adjusted to prevent the transmitting optical signal incident upon the reflector from being totally and internally reflected or externally reflected while the transmitting optical signal passes through the transmission and reception boundaries.

The transmission boundary may have a refractive index which is greater than a refractive index of the reception boundary and approximates to a refractive index in a range preset to the refractive indexes of the main and branch waveguides, and may internally refract the transmitting optical signal incident upon the reflector such that the transmitting optical signal propagates to an inside of the reflector, and the refractive index of the reflector may be gradually reduced from the transmission boundary to the reception boundary.

The transmission boundary may be formed in a sawtooth structure to internally refract the transmitting optical signal incident upon the reflector such that the transmitting optical signal propagates to an inside of the reflector.

When the refractive index of the reflector is greater than the refractive indexes of the main and branch waveguides, a transmission boundary included in the reflector may be formed at an angle, such that an incident angle of at least one of the transmitting and receiving optical signals incident upon the reflector is less than the critical angle and the transmitting optical signal incident upon the reflector is externally reflected to be directed to an inside of the reflector, and the transmission boundary may totally and internally reflect the receiving optical signal, which is externally refracted by the reception boundary included in the reflector and distinguished from the transmission boundary and propagates to the inside of the reflector, such that the receiving optical signal is transferred to a side boundary which is included in the reflector, distinguished from the transmission and reception boundaries and placed in a same direction as the branch waveguide is arranged.

The reception boundary may be formed at an angle such that the incident angle of the at least one of the transmitting and receiving optical signals upon the reflector is greater than the critical angle, and may externally refract the receiving optical signal incident upon the reflector such that the receiving optical signal propagates to an inside of the reflector. And, the reception boundary may internally refract the transmitting optical signal propagating to the inside of the reflector such that the transmitting optical signal propagates through the main waveguide.

The side boundary may be formed at an angle such that an incident angle of the receiving optical signal transferred to the side boundary is greater than the critical angle, and may internally refract the receiving optical signal such that the receiving optical signal is directed to the branch waveguide.

At least one of the refractive indexes of the main waveguide, the branch waveguide and the reflector, and the forming angles of the transmission, reception and side boundaries may be adaptively adjusted to prevent the transmitting optical signal incident upon the reflector from being totally and internal reflected or externally reflected while the transmitting optical signal propagates through the transmission and reception boundaries, and to prevent the receiving optical signal incident upon the reflector from being totally and internal reflected or externally reflected while the receiving optical signal propagates through the reception and side boundaries.

The reception boundary may have a refractive index which is less than a refractive index of the transmission boundary and approximates to the refractive indexes of the main and branch waveguides in a preset range, and may externally refract the receiving optical signal incident upon the reflector such that the receiving optical signal propagates to an inside of the reflector. And, the refractive index of the reflector may be gradually increased from the reception boundary to the transmission boundary.

The reception boundary may be formed in a sawtooth structure to externally refract the receiving optical signal incident upon the reflector such that the receiving optical signal propagates to an inside of the reflector.

The side boundary may have a refractive index which is less than a refractive index of the transmission boundary and approximates to a refractive index in a range preset to the refractive indexes of the main and branch waveguides, and may internally refract the receiving optical signal transferred thereto such that the receiving optical signal is directed to the branch waveguide.

The main and branch waveguides may be formed of a semiconductor device and the reflector may be doped with an impurity material such that the reflector has a refractive index different from the refractive indexes of the main and branch waveguides.

The reflector may be formed of semiconductor having a crystal defect such that the reflector has the reflective index different from the refractive indexes of the main and branch waveguides.

Advantageous Effects of the Invention

According to the embodiments, there may be provide a waveguide having a bi-directional optical transmission structure, which refracts or reflects transmitting and receiving optical signals incident upon a reflector in mutually different forms by using the reflector arranged at an intersection where a main waveguide crosses a branch waveguide connected to at least one of opposite ends of the main waveguide.

In detail, according to the embodiments, there may be provided a waveguide having a bi-directional optical transmission structure, which allows an incident transmitting optical signal to propagate to a main waveguide and an incident receiving optical signal to be directed to a branch waveguide by refracting the incident transmitting optical signal and reflecting the incident receiving optical signal.

In this case, according to the embodiment, there may be provided a waveguide having a bi-directional optical transmission structure, which allows an incident transmitting optical signal to propagate to a main waveguide and an incident receiving optical signal to be directed to a branch waveguide by using a passive reflection or transmission property of a reflector without any additional energy consumption.

In addition, according to the embodiments, a waveguide having a bi-directional optical transmission structure, which separates incident transmitting and receiving optical signals from each other by using a reflector without using any additional optical devices having a function of separating an optical signal according to the wavelength or polarization even though the incident transmitting and receiving optical signals have the same wavelength or polarization.

BEST MODE

Figure 1:
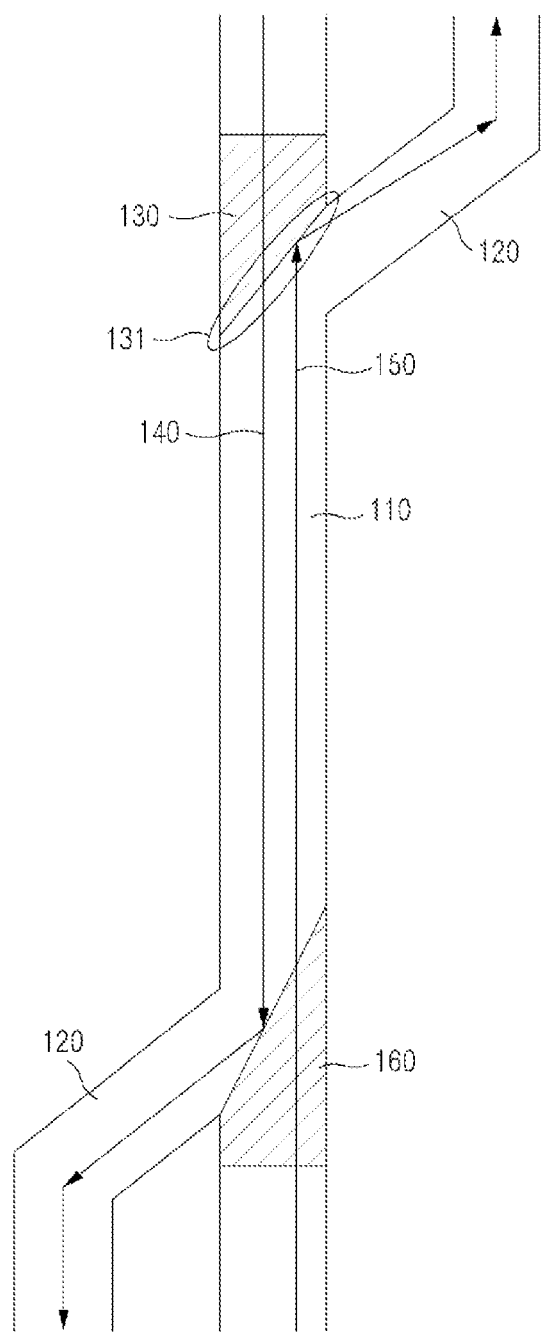
FIG. 1 is a view illustrating a waveguide having a bidirectional optical transmission structure according to an embodiment.

Hereinafter embodiments of the inventive concept will be described in detail with reference to the accompanying drawings. But, it should be understood that the inventive concept is not limited to the following embodiments. In addition, the same reference numerals used in each drawing represent the same elements.

FIG. 1 is a view illustrating a waveguide having a bidirectional optical transmission structure according to an embodiment.

Referring to FIG. 1, a waveguide having a bidirectional optical transmission structure may include a main waveguide 110, branch waveguides 120 connected to opposite ends of the main waveguide 110, respectively and upper and lower reflectors 130 and 160 arranged at intersections where the branch waveguides 120 are connected to the opposite ends of the main waveguide 110. In this case, a transmitting optical signal 140 incident upon the upper reflector 130 may be a receiving optical signal 140 incident upon the lower reflector 160. A receiving optical signal 150 incident upon the upper reflector 130 may be a transmitting optical signal 150 incident upon the lower reflector 160. However, a waveguide having a bidirectional optical transmission structure is not limited to the above, but may include a structure having one reflector.

Thus, a waveguide having a bidirectional optical transmission structure, which includes at least one reflector denoted as reference numeral 130, will be described below.

A waveguide having a bidirectional optical transmission structure according to an embodiment includes a main waveguide 110 formed in a preset direction, a branch waveguide 120 connected to at least one of the opposite ends of the main waveguide 110, and a reflector 130. In this case, the main and branch waveguides 110 and 120 may have a Y-shape.

The reflector 130, which is arranged at the intersection where the branch waveguide 120 is connected to the at least one of the opposite ends of the main waveguide 110, is formed of a medium different from those of the main and branch waveguides 110 and 120, such that the reflector 130 has an refractive index different from those of the main and branch waveguides 110 and 120, thereby refracting or reflecting the transmitting and receiving optical signals 140 and 150 incident thereupon in mutually different forms.

For example, the main and branch waveguides 110 and 120 may be formed of a semiconductor device, and the reflector 130 may be doped with an impurity material, such that the reflector 130 has a refractive index different from those of the main and branch waveguides 110 and 120. As another example, the main and branch waveguides 110 and 120 may be formed of a semiconductor device, and the reflector 130 may be formed of semiconductor having a crystal defect, such that the reflector 130 has a reflective index different from those of the main and branch waveguides 110 and 120.

Thus, the reflector 130 refracts or reflects the transmitting and receiving optical signals 140 and 150 incident thereupon in mutually different forms to allow the transmitting optical signal 140 to propagate to the main waveguide 110 and the receiving optical signal 150 to be directed to the branch waveguide 120.

Specifically, at least one of boundaries 131 included in the reflector 130 is formed at an angle such that an incident angle of at least one of the transmitting and receiving optical signals 140 and 150 incident upon the reflector 130 is less than a critical angle at which total internal reflection occurs, and the receiving optical signal 150 incident upon the reflector 130 is reflected to be directed to the branch waveguide 120 by utilizing the total internal reflection.

In this case, the optical principle utilized by the reflector 130 is as follows. When an optical signal propagates from a high refractive index medium $n_h$ to a low refractive index medium $n_1$ and an incident angle $\theta_i$ of the optical signal is less than a critical angle $\theta_c$ on the boundary ($\theta_i<\theta_c$), the optical signal is internally reflected on the boundary. When the incident angle $\theta_i$ is greater than a critical angle $\theta_c$, a part of the optical signal is internally refracted to propagate through the boundary. In this case, the incident angle $\theta_i$ is defined as an angle between the boundary and the incident direction, and the critical angle ($\theta_c$), which is a specific angle at which a total internal reflection occurs, is defined as following Equation 1.

$$\theta_c = \cos^{-1}(n_1/n_h) \qquad \text{<Equation 1>}$$

To the contrary, when an optical signal propagates from a low refractive index medium $n_1$ to a high refractive index medium $n_h$, one part of the optical signal transmits through the boundary due to external refraction and another part of the optical signal is externally reflected. In this case, when the incident angle approximates to 90 degrees, in generally, most of the optical signal is internally or externally refracted on the boundary to transmit through the boundary.

As described above, according to the waveguide having a bi-directional optical transmission structure of an embodiment, the refractive index of the reflector 130 is set to be different from those of the main and branch waveguides 110 and 120 and at least one of boundaries 131 included in the reflector 130 is formed at an angle to adjust an incident angle of at least one of the transmitting and receiving optical signals 140 and 150 upon the reflector 130, such that the transmitting and receiving optical signals 140 and 150 incident upon the reflector 130 are refracted or reflect in mutually different forms, thereby allowing the transmitting optical signal 140 incident upon the reflector 130 to propagate through the main waveguide 110 and the receiving optical signal 150 incident upon the reflector 130 to be directed to the branch waveguide 120. The details will be described below.

Figure 2:
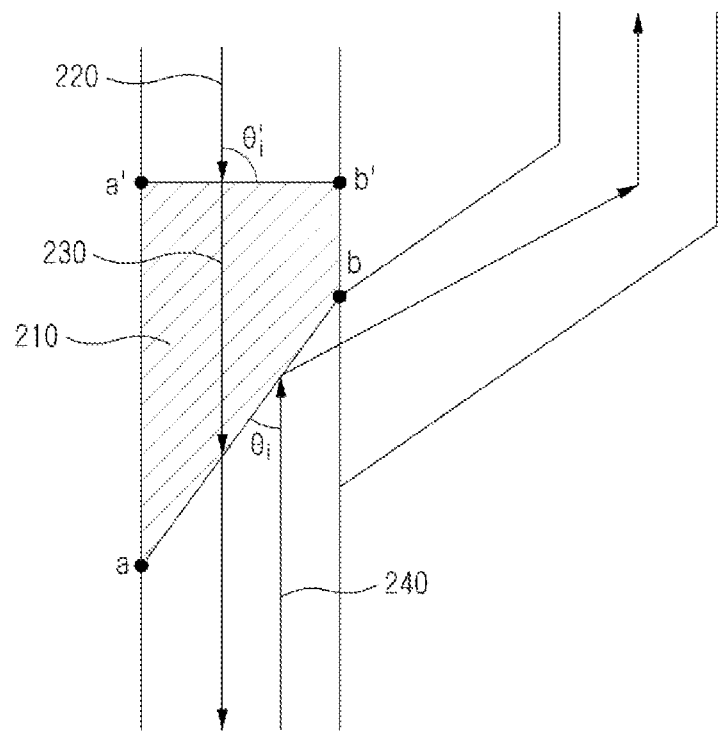
FIG. 2 is a view illustrating a waveguide having a bidirectional optical transmission structure according to a first embodiment.

FIG. 2 is a view illustrating a waveguide having a bidirectional optical transmission structure according to a first embodiment.

Referring to FIG. 2, the waveguide having a bidirectional optical transmission structure according to the first embodiment includes a main waveguide formed in a preset direction, a branch waveguide connected to at least one of the opposite ends of the main waveguide and a reflector 210.

The reflector 210, which is arranged at an intersection where at least one of the opposite ends of the main waveguide is connected to the branch waveguide, may be formed of a medium having a refractive index less than those of the main and branch waveguides.

In this case, a reception boundary a-b included in the reflector 210 may be formed at an angle such that an incident angle $\theta_i$ of at least one of transmitting and receiving optical signals 220 and 240 incident upon the reflector 210 is less than a critical angle $\theta_c$. Thus, the reception boundary a-b may totally and internally reflect the receiving optical signal 240 incident upon the reflector 210 such that the receiving optical signal 240 is directed to the branch waveguide.

In addition, the reception boundary a-b may externally refract the transmitting optical signal 230 which is internally refracted on the transmission boundary a'-b' to propagate through an inside of the reflector 210, such that the transmitting optical signal 230 propagates through the main waveguide.

In this case, the transmission boundary a'-b' may be formed at an angle such that an incident angle $\theta'_i$ of at least one of the transmitting and receiving optical signals 220 and 240 incident upon the reflector 210 is greater than the critical angle $\theta_c$. Thus, the transmission boundary a'-b' may internally refract the transmitting optical signal 220 incident upon the reflector 210 such that the transmitting optical signal 220 propagates through the inside of the reflector 210.

In addition, the transmission boundary a'-b' may have a refractive index which is greater than that of the reception boundary a-b and approximates to a refractive index in the range preset to the refractive indexes of the main and branch waveguides, and may internally refract the transmitting optical signal 220 incident upon the reflector 210 such that the transmitting optical signal propagates through an inside of the reflector 210. The details will be described below with reference to FIG. 4.

In addition, the transmission boundary a'-b' may be formed in a sawtooth structure to internally refract the transmitting optical signal 220 incident upon the reflector 210 such that the transmitting optical signal 220 propagates to an inside of the reflector 210. The details will be described below with reference to FIG. 6.

In this case, at least one of the refractive indexes of the main and branch waveguides and the reflector 210 and the forming angles of the transmission and reception boundaries a'-b' and a-b may be adaptively adjusted to prevent the transmitting optical signal 220 incident upon the reflector 210 from being totally and internal reflected or externally reflected while the transmitting optical signal 220 propagates through the transmission and reception boundaries a'-b' and a-b. Thus, the transmitting optical signal 220 incident upon the reflector 210 may mostly propagate through the inside of the reflector 210 to the main waveguide without being reflected.

In this case, as shown in the drawings, the reflector 210 may be formed to allow the transmission boundary a'-b' to have an incident angle $\theta'_i$ substantially perpendicular to the transmission boundary a'-b', and to allow the reception boundary a-b to have an incident angle $\theta_i$ to be less than the critical angle $\theta_c$, so that the reflector 210 is formed in a trapezoidal shape a'-b'-b-a, but the embodiment is not limited thereto. Under the conditions that the reflector 210 is formed to allow the transmission boundary a'-b' to have an incident angle $\theta'_i$ substantially perpendicular to the transmission boundary a'-b' and the reception boundary a-b to have an incident angle $\theta_i$ less than the critical angle $\theta_c$, the reflector 210 may be formed in a right-angled triangular shape where b' is closed to b.

The transmitting and receiving optical signals 220 and 240 incident upon the reflector 210 having the above-described structure propagate or are separated from each other according to the following operations of the transmission and reception boundaries a'-b' and a-b.

The transmitting optical signal 220 incident upon the reflector 210 may be internally refracted upon the transmission boundary a'-b' such that the transmitting optical signal 220 propagates to the inside of the reflector 210. The transmitting optical signal 230 propagating to the inside of the reflector 210 may be externally refracted upon the reception boundary a-b such that the transmitting optical signal 230 propagates through the main waveguide.

The receiving optical signal 240 incident upon the reflector 210 may be internally refracted upon the reception boundary a-b such that the receiving optical signal 240 propagates through the branch waveguide.

Figure 3:
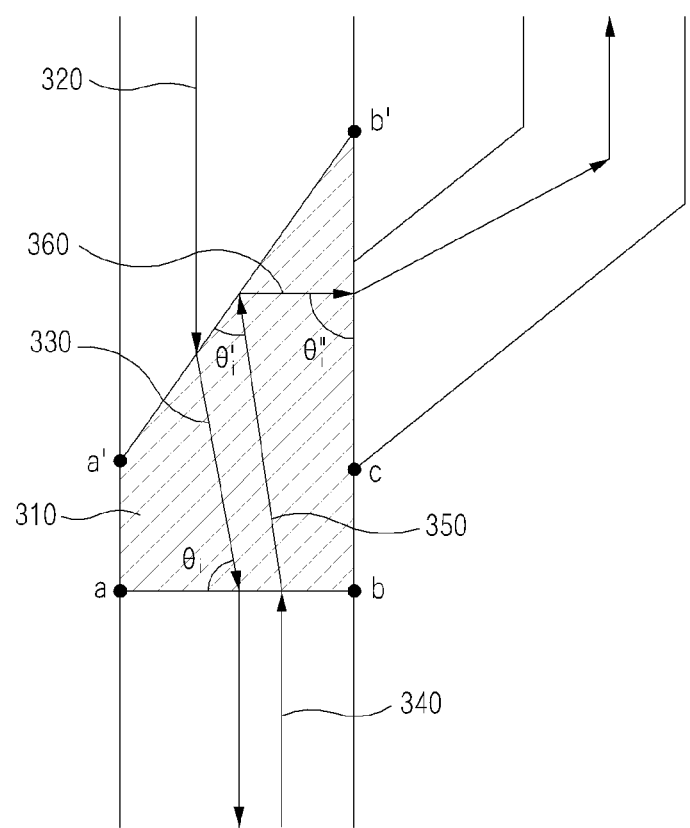
FIG. 3 is a view illustrating a waveguide having a bidirectional optical transmission structure according to a second embodiment.

FIG. 3 is a view illustrating a waveguide having a bidirectional optical transmission structure according to a second embodiment.

Referring to FIG. 3, the waveguide having a bidirectional optical transmission structure according to the second embodiment includes a main waveguide formed in a preset direction, a branch waveguide connected to at least one of the opposite ends of the main waveguide and a reflector 310.

The reflector 310, which is arranged at an intersection where at least one of the opposite ends of the main waveguide is connected to the branch waveguide, may be formed of a medium having a refractive index greater than those of the main and branch waveguides.

In this case, a transmission boundary a'-b' included in the reflector 310 may be formed at an angle such that an incident angle $\theta'_i$ of at least one of transmitting and receiving optical signals 320 and 340 incident upon the reflector 310 is less than a critical angle $\theta_e$. Thus, the transmission boundary a'-b' may totally and internally reflect the receiving optical signal 350 which is externally refracted upon the reception boundary a-b to propagate to an inside of the reflector 310, such that the receiving optical signal 350 is transferred to a side boundary b'-c.

In addition, the transmission boundary a'-b' may externally refract the transmitting optical signal 320 incident upon the reflector 310 to allow the transmitting optical signal 320 to propagate to the inside of the reflector 310.

In this case, the reception boundary a-b may be formed at an angle such that an incident angle $\theta_i$ of the transmitting or receiving optical signals 320 or 340 upon the reflector 310 is greater than the critical angle $\theta_c$. Thus, the reception boundary a-b may externally refract the receiving optical signal 340 incident upon the reflector 310 such that the receiving optical signal 340 propagates to the inside of the reflector 310.

In addition, the reception boundary a-b may internally refract the transmitting optical signal 330 propagating to the inside of the reflector 310 such that the transmitting optical signal 330 propagates to the main waveguide.

In addition, the reception boundary a-b may have a refractive index which is less than that of the transmission boundary a'-b' and approximates to a refractive index in the range preset to the refractive indexes of the main and branch waveguides, such that the reception boundary a-b externally refracts the receiving optical signal 340 incident upon the reflector 310 to allow the receiving optical signal 340 to propagate to the inside of the reflector 310 and internally refracts the transmitting optical signal 330 to allow the transmitting optical signal 330 to propagate to the inside of the reflector 310. The details will be described below with reference to FIG. 5.

In addition, the reception boundary a-b may be formed in a sawtooth structure to externally refract the receiving optical signal 340 incident upon the reflector 310 such that the receiving optical signal 340 propagates to the inside of the reflector 310. In addition, the reception boundary a-b may internally refract the transmitting optical signal 330 propagating to the inside of the reflector 310 to allow the transmitting optical signal 330 to propagate through the main waveguide. The details will be described below with reference to FIG. 6.

A side boundary b'-c may be formed at an angle such that an incident angle $\theta''_i$, of the receiving optical signal 360 transferred thereto is greater than the critical angle $\theta_c$. Thus, the side boundary b'-c may internally refract the receiving optical signal 360 transferred thereto such that the receiving optical signal is directed to the branch waveguide.

In addition, the side boundary b'-c may have a refractive index which is less than that of the transmission boundary a'-b' and approximates to a refractive index in the range preset to the refractive indexes of the main and branch waveguides, such that the receiving optical signal transferred thereto is internally refracted, thereby directing the receiving optical signal 360 to the branch waveguide.

In this case, at least one of the refractive indexes of the main and branch waveguides and the reflector 310, forming angles of the transmission and reception boundaries a'-b' and a-b, and a forming angle of the side boundary b'-c may be adaptively adjusted to prevent the transmitting optical signal 320 incident upon the reflector 310 from being totally and internal reflected or externally reflected while the transmitting optical signal 320 propagates through the transmission and reception boundaries a'-b' and a-b, and in addition, to prevent the receiving optical signal 340 incident upon the reflector 310 from being totally and internally reflected or externally reflected while the receiving optical signal 340 incident upon the reflector 310 propagates through the reception and side boundaries a-b and b'-c. Thus, the transmitting optical signal 320 incident upon the reflector 310 may mostly propagate to the inside of the reflector 310 and the main waveguide without being reflected. The receiving optical signal 340 incident upon the reflector 310 may mostly propagate to the inside of the reflector 310 on the reception and side boundaries a-b and b'-c and may be directed to the branch waveguide without being reflected.

In this case, as shown in the drawings, the reflector 310 may be formed to allow the reception boundary a-b to have an incident angle $\theta_i$ substantially perpendicular to the reception boundary a-b, to allow the transmission boundary a'-b' to have an incident angle $\theta'_i$ to be less than the critical angle $\theta_c$, and to allow the side boundary b'-c to be parallel to a boundary between the main and branch waveguides, so that the reflector 310 is formed in a trapezoidal shape a'-b'-b-a, but the embodiment is not limited thereto. Under the conditions that the reception boundary a-b is formed such that the incident angle $\theta'_i$ which is substantially perpendicular to the reception boundary a-b is less than the critical angle $\theta_c$ and the side boundary b'-c is parallel to the boundary between the main and branch waveguides, the reflector 310 may be formed in a right-angled triangular shape where a' is closed to a.

The transmitting and receiving optical signals 320 and 340 incident upon the reflector 310 having the above-described structure propagate or are separated from each other according to following operations of the transmission and reception boundaries a'-b' and a-b.

The transmitting optical signal 320 incident upon the reflector 210 may be externally refracted upon the transmission boundary a'-b' such that the transmitting optical signal 320 propagates to the inside of the reflector 310. The transmitting optical signal 330 propagating to the inside of the reflector 310 may be internally refracted upon the reception boundary a-b such that the transmitting optical signal 330 propagates through the main waveguide.

The receiving optical signal 340 incident upon the reflector 310 may be externally refracted upon the reception boundary a-b such that the receiving optical signal 340 propagates to the inside of the reflector 310. After the receiving optical signal 350 propagating to the inside of the reflector 310 is totally and internally reflected on the transmission boundary a'-b' such that the receiving optical signal 350 is transferred to the side boundary b'-c, the receiving optical signal 360 may be internally refracted on the side boundary b'-c such that the receiving optical signal 350 is directed to the branch waveguide.

Figure 4:
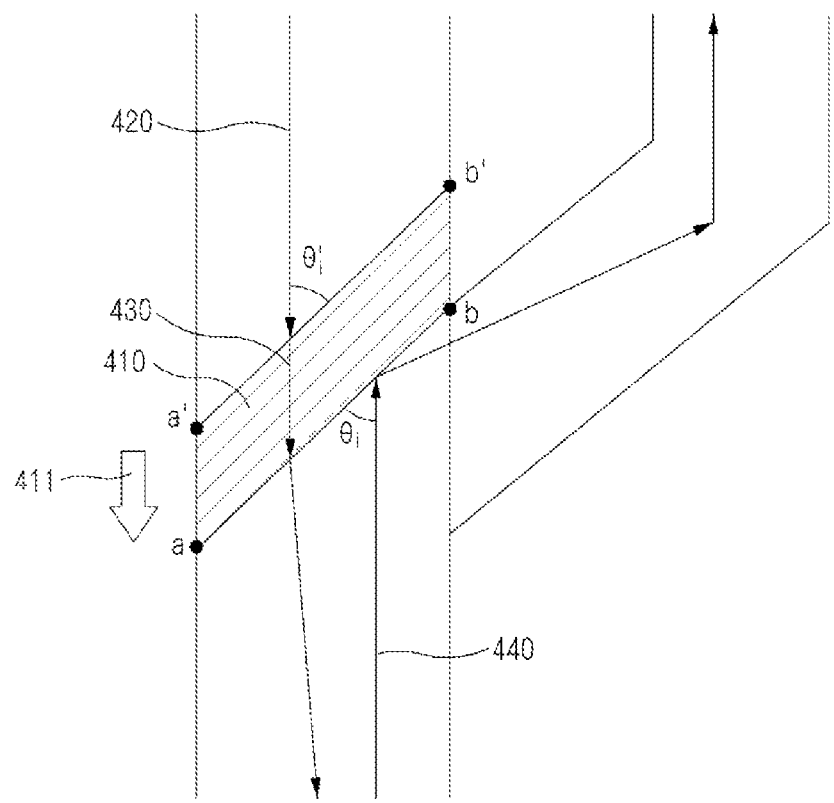
FIG. 4 is a view illustrating a waveguide having a bidirectional optical transmission structure according to a third embodiment.

FIG. 4 is a view illustrating a waveguide having a bidirectional optical transmission structure according to a third embodiment.

Referring to FIG. 4, the waveguide having a bidirectional optical transmission structure according to the third embodiment includes a main waveguide formed in a preset direction, a branch waveguide connected to at least one of opposite ends of the main waveguide and a reflector 410.

The reflector 410, which is arranged at an intersection where at least one of the opposite ends of the main waveguide is connected to the branch waveguide, may be formed of a medium having a refractive index less than those of the main and branch waveguides.

However, differently from the reflector included in the waveguide having a bidirectional optical transmission structure depicted in FIG. 2, the refractive index of the reflector 410 is less than those of the main and branch waveguides. In addition, the transmission boundary a'-b' has a refractive index which is greater than that of the reception boundary a-b and approximates to a refractive index in the range preset to those of the main and branch waveguides, such that the refractive index of the reflector 410 is gradually reduced from the transmission boundary a'-b' to the reception boundary a-b (411). In this case, the refractive index of the reflector 410 may be gradually reduced from the transmission boundary a'-b' to the reception boundary a-b or reduced stage by stage according to plural layers.

Thus, the refractive index $n_{a\text{-}b}$ of the reception boundary a-b which is an abrupt boundary, the refractive index $n_{a'\text{-}b'}$ of the transmission boundary a'-b' which is a smeared boundary, and the refractive indexes n of the main and branch waveguides are expressed as following equation 2 (inequality).

$$n_{a\text{-}b} < n_{a'\text{-}b'} \approx n \qquad \text{<Equation 2>}$$

Therefore, without need to form the transmission boundary a'-b' at an angle such that the incident angle $\theta'_i$ of at least one of the transmitting and receiving optical signals 420 and 440 incident upon the reflector 410 is greater than the critical angle $\theta_c$, the transmission boundary a'-b' may internally refract the transmitting optical signal 420 incident upon the reflector 410 only by changing the refractive index, such that the transmitting optical signal 420 propagates to the inside of the reflector 410.

The reception boundary a-b included in the reflector 410 may be formed at an angle such that the incident angle $\theta_i$ of at least one of the transmitting and receiving optical signals 420 and 440 incident upon the reflector 410 is less than the critical angle $\theta_c$. Thus, the reception boundary a-b may totally and internally reflect the receiving optical signal 440 incident upon the reflector 410 such that the receiving optical signal 440 is directed to the branch waveguide.

In addition, the reception boundary a-b may externally refract the transmitting optical signal 430 which is internally refracted on the transmission boundary a'-b' to propagate through the inside of the reflector 410, such that the transmitting optical signal 430 propagates through the main waveguide.

Figure 5:
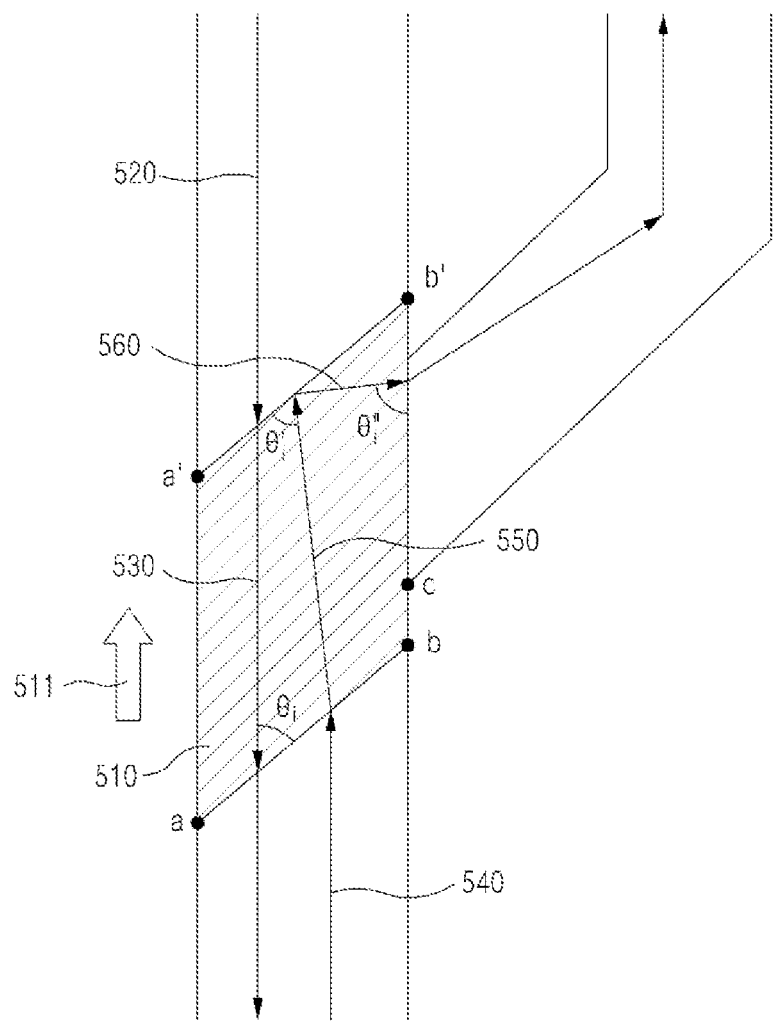
FIG. 5 is a view illustrating a waveguide having a bidirectional optical transmission structure according to a fourth embodiment.

FIG. 5 is a view illustrating a waveguide having a bidirectional optical transmission structure according to a fourth embodiment.

Referring to FIG. 5, the waveguide having a bidirectional optical transmission structure according to the fourth embodiment includes a main waveguide formed in a preset direction, a branch waveguide connected to at least one of opposite ends of the main waveguide and a reflector 510.

The reflector 510, which is arranged at an intersection where at least one of the opposite ends of the main waveguide is connected to the branch waveguide, may be formed of a medium having a refractive index greater than those of the main and branch waveguides. However, differently from the reflector included in the waveguide having a bidirectional optical transmission structure depicted in FIG. 3, the refractive index of the reflector 510 is greater than those of the main and branch waveguides. In addition, the reception boundary a-b has a refractive index which is less than that of the transmission boundary a'-b' and approximates to a refractive index in the range preset to those of the main and branch waveguides, such that the refractive index of the reflector 510 is gradually increased from the reception boundary a-b to the transmission boundary a'-b' (511). In this case, the refractive index of the reflector 510 may be gradually and continuously reduced from the reception boundary a-b to the transmission boundary a'-b' or reduced stage by stage according to plural layers.

Thus, the refractive index $n_{a'\text{-}b'}$ of the transmission boundary a'-b' which is an abrupt boundary, the refractive index $n_{a\text{-}b}$ of the reception boundary a-b which is a smeared boundary, and the refractive indexes n of the main and branch waveguides are expressed as following equation 3 (inequality).

$$n_{a'\text{-}b'} > n_{a\text{-}b} \approx n \qquad \text{<Equation 3>}$$

Therefore, without need to form the reception boundary a-b at an angle such that the incident angle $\theta_i$ of at least one of the transmitting and receiving optical signals 520 and 540 incident upon the reflector 510 is greater than the critical angle $\theta_c$, only by changing the refractive index, the reception boundary a-b may externally refract the receiving optical signal 540 incident upon the reflector 510 such that the receiving optical signal 540 propagates to the inside of the reflector 510 and may internally refract the transmitting optical signal 530 propagating to the inside of the reflector 510 such that the transmitting optical signal 530 propagates through the main waveguide.

The transmission boundary a'-b' included in the reflector 510 may be formed at an angle such that the incident angle $\theta_i$ of at least one of the transmitting and receiving optical signals 520 and 540 incident upon the reflector 510 is less than the critical angle $\theta_c$. Thus, the transmission boundary a'-b' may totally and internally reflect the receiving optical signal 550 which is externally refracted on the reception boundary a-b to propagate to the inside of the reflector 510, such that the receiving optical signal 550 is directed to the side boundary b'-c.

In addition, the transmission boundary a'-b' may externally refract the transmitting optical signal 520 incident upon the reflector 510 to allow the transmitting optical signal 520 to propagate to the inside of the reflector 510.

The side boundary b'-c may be formed at an angle such that the incident angle $\theta'_i$ of the receiving optical signal 560 transferred thereto is greater than the critical angle $\theta_c$. Thus, the side boundary b'-c may internally refract the receiving optical signal 560 transferred thereto such that the receiving optical signal 560 is directed to the branch waveguide.

Likewise, the side boundary b'-c may have a refractive index which is less than that of the transmission boundary a'-b' and approximates to a refractive index in the range preset to the refractive indexes of the main and branch waveguides, such that the receiving optical signal 360 transferred thereto is internally refracted only changing the refractive index without need to form the side boundary b'-c at an angle such that the incident angle $\theta'_i$ of the transferred receiving optical signal 560 is greater than the critical angle $\theta_c$, thereby directing the receiving optical signal 360 to the branch waveguide.

Figure 6:
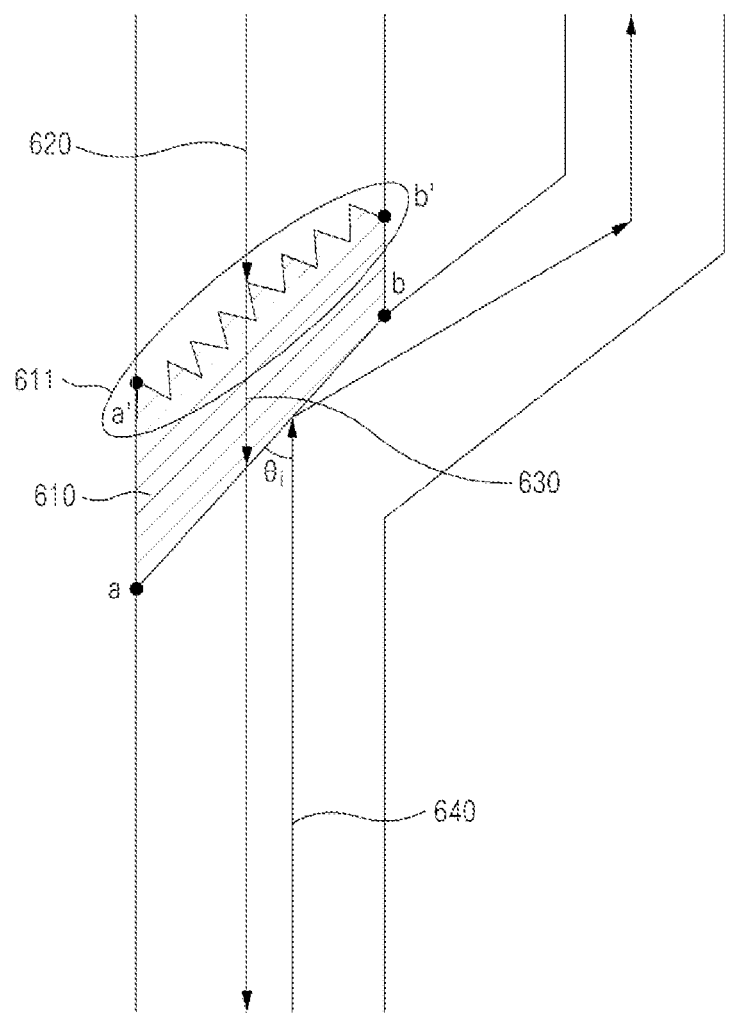
FIG. 6 is a view illustrating a waveguide having a bidirectional optical transmission structure according to a fifth embodiment.

FIG. 6 is a view illustrating a waveguide having a bidirectional optical transmission structure according to a fifth embodiment.

Referring to FIG. 6, the waveguide having a bidirectional optical transmission structure according to the fifth embodiment includes a main waveguide formed in a preset direction, a branch waveguide connected to at least one of opposite ends of the main waveguide and a reflector 610.

The reflector 610, which is arranged at an intersection where at least one of the opposite ends of the main waveguide is connected to the branch waveguide, may be formed of a medium having a refractive index less than those of the main and branch waveguides.

Without need to form the transmission boundary a'-b' at an angle such that the incident angle $\theta'_i$ of at least one of the transmitting and receiving optical signals 420 and 440 incident upon the reflector 610 is greater than the critical angle $\theta_c$, the transmission boundary a'-b' may be formed in a sawtooth structure 611 such that the transmitting optical signal 620 incident upon the reflector 610 is internally refracted, thereby allowing the transmitting optical signal 620 to propagate to the inside of the reflector 610. In this case, the sawtooth structure 611 may include a moth-eye structure where a needle or a trigonal pyramid having a size less than a wavelength of an optical signal is repeatedly arranged. Since the sawtooth 611 has an effect capable of continuously changing an average refractive index of an optical signal, the sawtooth structure 611 is applied to the transmission boundary a'-b', such that the transmitting optical signal 620 incident upon the reflector 610 may propagate to the inside of the reflector 610 without reflecting the transmitting optical signal 620.

The reception boundary a-b included in the reflector 610 may be formed at an angle such that the incident angle $\theta_i$ of at least one of the transmitting and receiving optical signals 620 and 640 incident upon the reflector 610 is less than the critical angle $\theta_c$. Thus, the reception boundary a-b may totally and internally reflect the receiving optical signal 640 incident upon the reflector 610 such that the receiving optical signal 640 is directed to the branch waveguide.

In addition, the reception boundary a-b may externally refract the transmitting optical signal 630 which is internally refracted on the transmission boundary a'-b' to propagate to the inside of the reflector 410, such that the transmitting optical signal 630 propagates through the main waveguide.

Likewise, the sawtooth structure 611 may be applied to the reception boundary a-b of the reflector included in the waveguide having a bidirectional optical transmission structure show in FIG. 5, such that the reception boundary a-b is formed without need to form the reception boundary a-b at an angle such that the incident angle of at least one of the transmitting and receiving optical signals incident upon the reflector is greater than the critical angle $\theta_c$, thereby externally refracting the receiving optical signal incident upon the reflector to allow the receiving optical signal to propagate to the inside of the reflector.

Mode of Embodiment

While this disclosure includes specific examples, it will be apparent to those skilled in the art that various modifications and variations can be made in the inventive concept without departing from the spirit or scope of the inventions. For example, the above-described techniques may be executed in an order different from that described in the description of the inventive concept, and/or the components of the above-described system, structure, equipment (or device), circuit, and so on, may be combined in a format different that of the above-described method according the inventive concept, and an adequate result may be achieved even if the above-described components of the inventive concept are replaced by any other component or its equivalent.

Thus, it is intended that the inventive concept covers other realizations and other embodiments of this invention provided they come within the scope of the appended claims and their equivalents.

The invention claimed is:

1. A waveguide having a bi-directional optical transmission structure, the waveguide comprising:
    a main waveguide formed in a preset direction;
    a branch waveguide connected to at least one of opposite ends of the main waveguide; and
    a reflector arranged at an intersection where the at least one of the opposite ends of the main waveguide is connected to the branch waveguide, the reflector having a refractive index different from refractive indexes of the main waveguide and the branch waveguide,
    wherein the reflector refracts or reflects a transmitting optical signal and a receiving optical signal incident thereupon in mutually different forms, such that the transmitting optical signal propagates to the main waveguide and the receiving optical signal is directed to the branch waveguide,
    wherein the main and branch waveguides are formed of a semiconductor device, and
    wherein the reflector is doped with an impurity material such that the reflector has a refractive index different from the refractive indexes of the main and branch waveguides.

2. The waveguide of claim 1,
    wherein at least one of boundaries included in the reflector is formed at an angle such that an incident angle of at least one of the transmitting and receiving optical signals incident upon the reflector is less than a critical angle at which total internal reflection occurs, and
    wherein the receiving optical signal incident upon the reflector is reflected to be directed to the branch waveguide by utilizing the total internal reflection.

3. The waveguide of claim 2,
    wherein, when the refractive index of the reflector is less than the refractive indexes of the main and branch waveguides, a reception boundary included in the reflector is formed at an angle, such that an incident angle of at least one of the transmitting and receiving optical signals incident upon the reflector is less than the critical angle and the receiving optical signal incident upon the reflector is totally and internally reflected to be directed to the branch waveguide, and
    wherein the reception boundary externally refracts the transmitting optical signal, which is internally refracted by a transmission boundary included in the reflector and distinguished from the reception boundary to propagate to an inside of the reflector, such that the transmitting optical signal propagates to the main waveguide.

4. The waveguide of claim 3, wherein the transmission boundary is formed at an angle such that the incident angle of the at least one of the transmitting and receiving optical signals incident upon the reflector is greater than the critical angle, and the transmission boundary internally refracts the transmitting optical signal incident upon the reflector such that the transmitting optical signal propagates to an inside of the reflector.

5. The waveguide of claim 4, wherein at least one of the refractive indexes of the main and branch waveguides and the reflector and the angles of the transmission and reception boundaries is adaptively adjusted to prevent the transmitting optical signal incident upon the reflector from being totally and internally reflected or externally reflected while the transmitting optical signal passes through the transmission and reception boundaries.

6. The waveguide of claim 3,
    wherein the transmission boundary has a refractive index which is greater than a refractive index of the reception boundary and approximates to a refractive index in a range preset to the refractive indexes of the main and branch waveguides, and internally refracts the transmitting optical signal incident upon the reflector such that the transmitting optical signal propagates to an inside of the reflector, and
    wherein the refractive index of the reflector is gradually reduced from the transmission boundary to the reception boundary.

7. The waveguide of claim 3, wherein the transmission boundary is formed in a sawtooth structure to internally refract the transmitting optical signal incident upon the reflector such that the transmitting optical signal propagates to an inside of the reflector.

8. The waveguide of claim 2,
    wherein, when the refractive index of the reflector is greater than the refractive indexes of the main and branch waveguides, a transmission boundary included in the reflector is formed at an angle, such that an incident angle of at least one of the transmitting and receiving optical signals incident upon the reflector is less than the critical angle and the transmitting optical signal incident upon the reflector is externally refracted to be directed to an inside of the reflector, and
    wherein the transmission boundary totally and internally reflects the receiving optical signal, which is externally refracted by the reception boundary included in the reflector and distinguished from the transmission boundary and propagates to the inside of the reflector, such that the receiving optical signal is transferred to a side boundary which is included in the reflector, distinguished from the transmission and reception boundaries and placed in a same direction as the branch waveguide is arranged.

9. The waveguide of claim 8,
wherein the reception boundary is formed at an angle such that the incident angle of the at least one of the transmitting and receiving optical signals incident upon the reflector is greater than the critical angle, and the reception boundary externally refracts the receiving optical signal incident upon the reflector such that the receiving optical signal propagates to an inside of the reflector, and
wherein the reception boundary internally refracts the transmitting optical signal propagating to the inside of the reflector such that the transmitting optical signal propagates through the main waveguide.

10. The waveguide of claim 8, wherein the side boundary is formed at an angle such that an incident angle of the receiving optical signal transferred to the side boundary is greater than the critical angle, and internally refracts the receiving optical signal such that the receiving optical signal is directed to the branch waveguide.

11. The waveguide of claim 10, wherein at least one of the refractive indexes of the main waveguide, the branch waveguide and the reflector, and the forming angles of the transmission, reception and side boundaries is adaptively adjusted to prevent the transmitting optical signal incident upon the reflector from being totally and internal reflected or externally reflected while the transmitting optical signal propagates through the transmission and reception boundaries, and to prevent the receiving optical signal incident upon the reflector from being totally and internal reflected or externally reflected while the receiving optical signal propagates through the reception and side boundaries.

12. The waveguide of claim 8,
wherein the reception boundary has a refractive index which is less than a refractive index of the transmission boundary and approximates to the refractive indexes of the main and branch waveguides in a preset range, and externally refracts the receiving optical signal incident upon the reflector such that the receiving optical signal propagates to an inside of the reflector, and
wherein the refractive index of the reflector is gradually increased from the reception boundary to the transmission boundary.

13. The waveguide of claim 8, wherein the reception boundary is formed in a sawtooth structure to externally refract the receiving optical signal incident upon the reflector such that the receiving optical signal propagates to an inside of the reflector.

14. The waveguide of claim 8, wherein the side boundary has a refractive index which is less than a refractive index of the transmission boundary and approximates to a refractive index in a range preset to the refractive indexes of the main and branch waveguides, and internally refracts the receiving optical signal transferred thereto such that the receiving optical signal is directed to the branch waveguide.

15. The waveguide of claim 1, wherein the reflector is formed of semiconductor having a crystal defect such that the reflector has the reflective index different from the refractive indexes of the main and branch waveguides.

* * * * *